United States Patent [19]

Ishii et al.

[11] Patent Number: 5,086,367
[45] Date of Patent: Feb. 4, 1992

[54] CIRCUIT BREAKER

[75] Inventors: Kazuhiro Ishii; Hideaki Moriwaki, both of Hiroshima, Japan

[73] Assignee: Mitsubishi Denki K.K., Tokyo, Japan

[21] Appl. No.: 620,445

[22] Filed: Dec. 3, 1990

Related U.S. Application Data

[63] Continuation of Ser. No. 376,462, Jul. 7, 1989, abandoned.

[30] Foreign Application Priority Data

Jul. 8, 1988 [JP] Japan ................. 63-168996

[51] Int. Cl.⁵ ............................................ H02H 3/093
[52] U.S. Cl. .......................................... 361/94; 361/87; 340/664
[58] Field of Search .................. 361/87, 93, 94; 307/130, 131; 340/661, 662, 664

[56] References Cited

U.S. PATENT DOCUMENTS

| | | | |
|---|---|---|---|
| 3,775,675 | 11/1973 | Freeze et al. | 361/110 X |
| 4,193,104 | 3/1980 | Nercessiah | 361/110 X |
| 4,335,437 | 6/1982 | Wilson et al. | 364/483 |
| 4,558,310 | 12/1985 | McAllise | 361/94 X |
| 4,713,718 | 12/1987 | Quayle | 361/29 |
| 4,860,153 | 8/1989 | Ishii | 361/93 X |

FOREIGN PATENT DOCUMENTS

| | | |
|---|---|---|
| 0045286 | 2/1982 | European Pat. Off. . |
| 3501353 | 7/1986 | Fed. Rep. of Germany . |
| 2497013 | 6/1982 | France . |
| 2564648 | 11/1985 | France . |

*Primary Examiner*—Todd E. DeBoer
*Attorney, Agent, or Firm*—Sughrue, Mion, Zinn, Macpeak & Seas

[57] ABSTRACT

A circuit breaker having the overcurrent tripping characteristic, which is capable of detecting an overcurrent flowing through main circuit between an ac source and a load. The circuit breaker comprises a pre-alarm circuit having a pre-alarm characteristic, a pre-alarm signal output circuit for producing an alarm in response to the output of the pre-alarm circuit and a photocoupler for controlling the data transmission between the circuits. The circuit breaker can detect the main circuit current before it becomes an overcurrent and generate the alarm accurately.

3 Claims, 3 Drawing Sheets

CIRCUIT BREAKER

This is a continuation of application Ser. No. 07/376,462 filed July 7, 1989 now abandoned.

BACKGROUND OF THE INVENTION

This invention relates to a circuit breaker, and more particularly to a circle it breaker which is capable of detecting a current flowing through a main circuit, which is smaller than an overcurrent, to thereby generate an alarm before the overcurrent flows into the main circuit resulting in interrupting and a switch mechanism.

FIG. 1 shows a block diagram showing a conventional circuit breaker. In the figure, reference numeral 1 designates an AC power source, e.g., a three-phase AC power source; 2, a load to which an electric power is supplied from the AC power source 1; and 3, a circuit breaker connected between the AC power source 1 and the load 2. This circuit breaker 3 comprises a main circuit 5 including three-phase power lines 5a, 5b and 5c coupled through a switch mechanism 4 to the AC power source; current transformers CTa, CTb and CTc connected to the power lines 5a, 5b and 5c of this main circuit 5; a rectifier 6 connected to the secondary sides of these current transformers; a maximum phase selector/peak value converter 7 and a maximum phase selector/effective value converter 8, which are connected to the output of the rectifier 6; an instantaneous circuit 9 and a short time duration 10, which are connected to the maximum phase selector/peak value converter 7; a long time duration circuit 11 connected to the output of the maximum phase selector/effective value converter 8; a trigger circuit 12 connected to the outputs of the instantaneous circuit 9, the short time duration circuit 10 and the long time duration circuit 11; a tripping coil 13 connected across the rectifier 6 through this trigger circuit 12; and an LED 14 for indicating an occurrence of an overcurrent connected to the long time duration circuit 11. Those circuits 7 to 11 are formed integrally as an IC.

FIG. 2 is a graphical representation showing a curve representative of an overcurrent tripping characteristic of the circuit breaker 3 shown in FIG. 1.

The conventional circuit breaker 3 which is assembled as described above, will be described with reference to FIGS. 1 and 2. It is now assumed that the switch mechanism 4 of the circuit breaker 3 is closed, and not tripped so that a current flows from the AC power source 1 through the main circuit 5 to the load 2. The current transformers CTa, CTb and CTc operate to produce at the secondary side thereof secondary currents proportional to the main circuit current. The rectifier 6 rectifies the AC secondary currents of three phases, respectively. The maximum phase selector/peak value converter 7 selects the rectified signal of the maximum phase of the rectified signals of three phases, which are derived from the rectifier 6, and subjects the rectified signal to a peak value conversion. Similarly, the maximum phase selector/effective value converter 8 selects the rectified signal of the maximum phase, and subjects the rectified signal to an effective value conversion. A DC signal of the converted peak value is applied to the instantaneous circuit 9 and the short time duration circuit 10, which have respectively an instantaneous characteristic INST and a short time duration characteristic STD, those being involved in an overcurrent tripping characteristic shown in FIG. 2. A DC signal of the converted effective value is supplied to the long time duration circuit 11 with a long time duration characteristic LTD. When a main circuit current exceeds a value of 125%, for example, of the rated current, the long time duration circuit 11 energizes the LED 14 to light on. Further, at that time, the circuit 11 produces an output signal to turn on the trigger circuit 12 after a predetermined period of time shown in FIG. 4, which is determined depending on the DC signal of the converted effective value, for example, a value in the range of 125% to 1000% of the rated value. When the trigger circuit 12 is turned on, the tripping coil 13 is energized by the rectified signal output from the rectifier 6, as a result of which the switch mechanism 4 is opened to interrupt the main circuit current. Similarly, when the main circuit current increases to exceed the current values of 1000% and 1700%, for example, of the rated current, the short time duration circuit 10 and the instantaneous circuit 9 produce output signals to interrupt the main circuit current.

With such a conventional circuit breaker as described above, it is not until having an overcurrent tripping characteristic an occurrence of overcurrent in the main circuit current that the main circuit is interrupted. Further, it is disadvantageous that the circuit breaker has no pre-alarm characteristic to generate an alarm immediately before the main circuit current becomes an overcurrent.

SUMMARY OF THE INVENTION

In view of the above, an object of the present invention is to provide a circuit breaker which has a pre-alarm property and which can operate accurately regardless of malfunction of a pre-alarm output circuit.

The above, and other objects of the present invention are accomplished by the provision of a circuit breaker comprising: a pre-alarm circuit with such a pre-alarming function as to generate an alarm before a current flowing through a main circuit exceeds an overcurrent; a pre-alarm signal output circuit driven by an output signal from the pre-alarm circuit; and a photo coupler coupled in such a direction as to block the transmission of a signal from the pre-alarm signal output circuit to the pre-alarm circuit.

In a circuit breaker according to the present invention, when the pre-alarm circuit with a pre-alarm characteristic detects a main circuit current before it becomes an overcurrent, the pre-alarm circuit generates an output signal to be supplied through a unidirectional photocoupler to the pre-alarm signal output circuit. The output signal of the pre-alarm signal output circuit energizes a relay coil, so that a buzzer is driven, and at the same time an LED for pre-alarm indication is lit on.

DESCRIPTION OF THE PREFERRED-EMBODIMENTS

Figure 3:
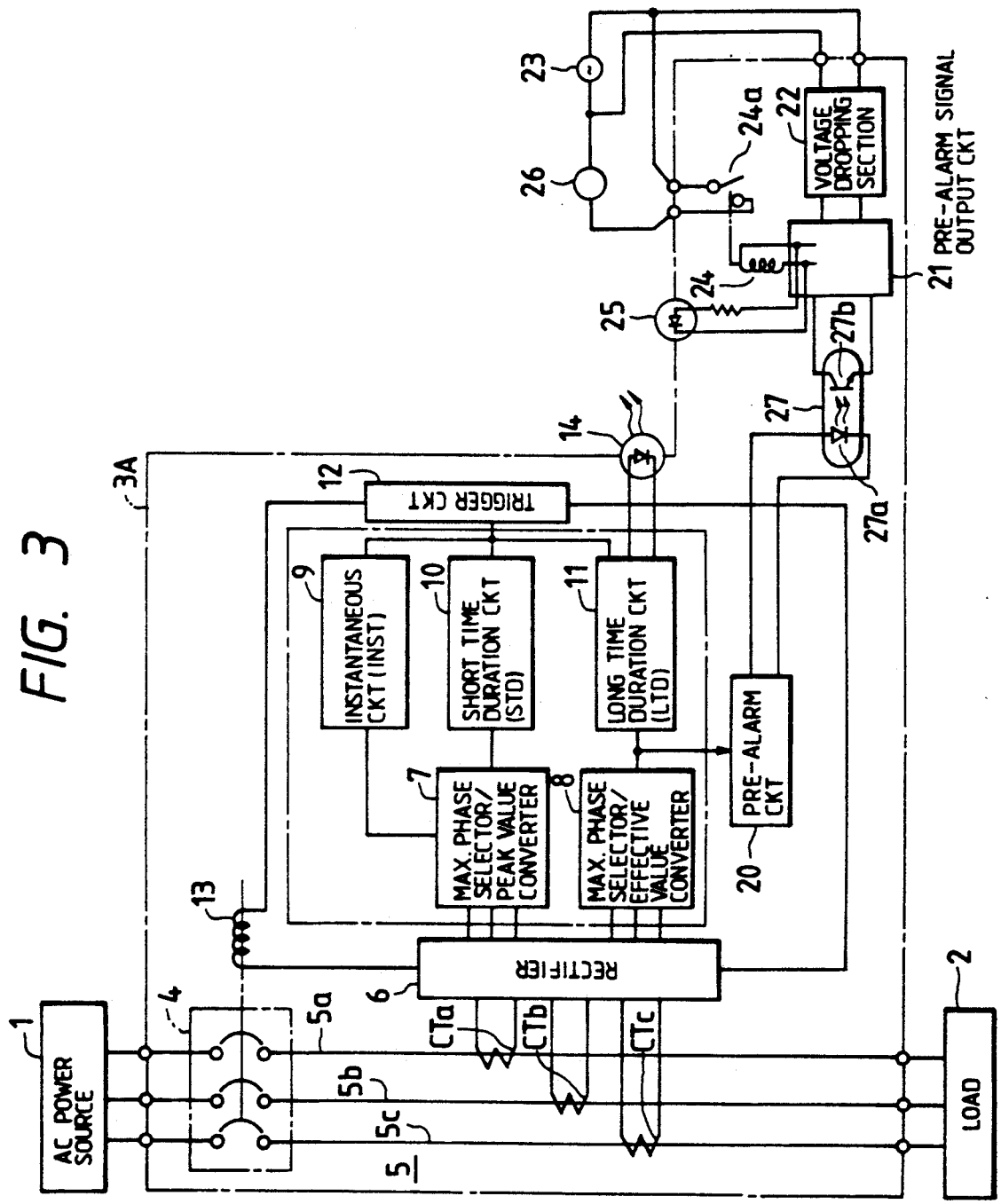
FIG. 3 is block diagram showing a circuit arrangement of an embodiment of a circuit breaker according to the present invention.

FIG. 3 is a block diagram showing a circuit arrangement of an embodiment of the present invention. In the figure, the components designated by reference numerals 1, 2, 4 to 14 are exactly same as those in FIG. 3. A circuit breaker 3A according to the present invention further comprises a pre-alarm circuit 20, a photocoupler 27, a pre-alarm signal output circuit 21, a control power source 23 at 100V AC, a relay coil 24 and its normally open contact 24a, an LED 25 for pre-alarm indication, and a buzzer 26. The pre-alarm circuit 20 is connected to the output side of the maximum phase selector/effective value converter 8, and has a pre-alarm characteristic to detect a main circuit current having a certain current level before it becomes an overcurrent to thereby generate an alarm. The photocoupler 27 is made up of a light emission diode 27a and a phototransistor 27b, the LED 27a is coupled with the output side of the pre-alarm circuit 20 to convert an electrical alarm signal into an optical signal, and the phototransistor 27b operates to restore the optical signal to the original electrical signal. The pre-alarm output circuit 21 is coupled with the output side of this photo coupler 27, i.e., the photo transistor 27b. The output circuit 21 is driven by the electrical pre-alarm signal. The control power source 23 is connected through a voltage dropping section such as a transformer 22, to the terminals of the pre-alarm signal output circuit 21. The relay coil 24 is energized by the output signal of the pre-alarm signal output circuit 21. The LED 25 is connected across the relay coil 24, and is lit on by the output signal of the pre-alarm output circuit 21. The buzzer 26 is connected to both ends of the control power source 23, through the normally open contact 24a.

Figure 1:
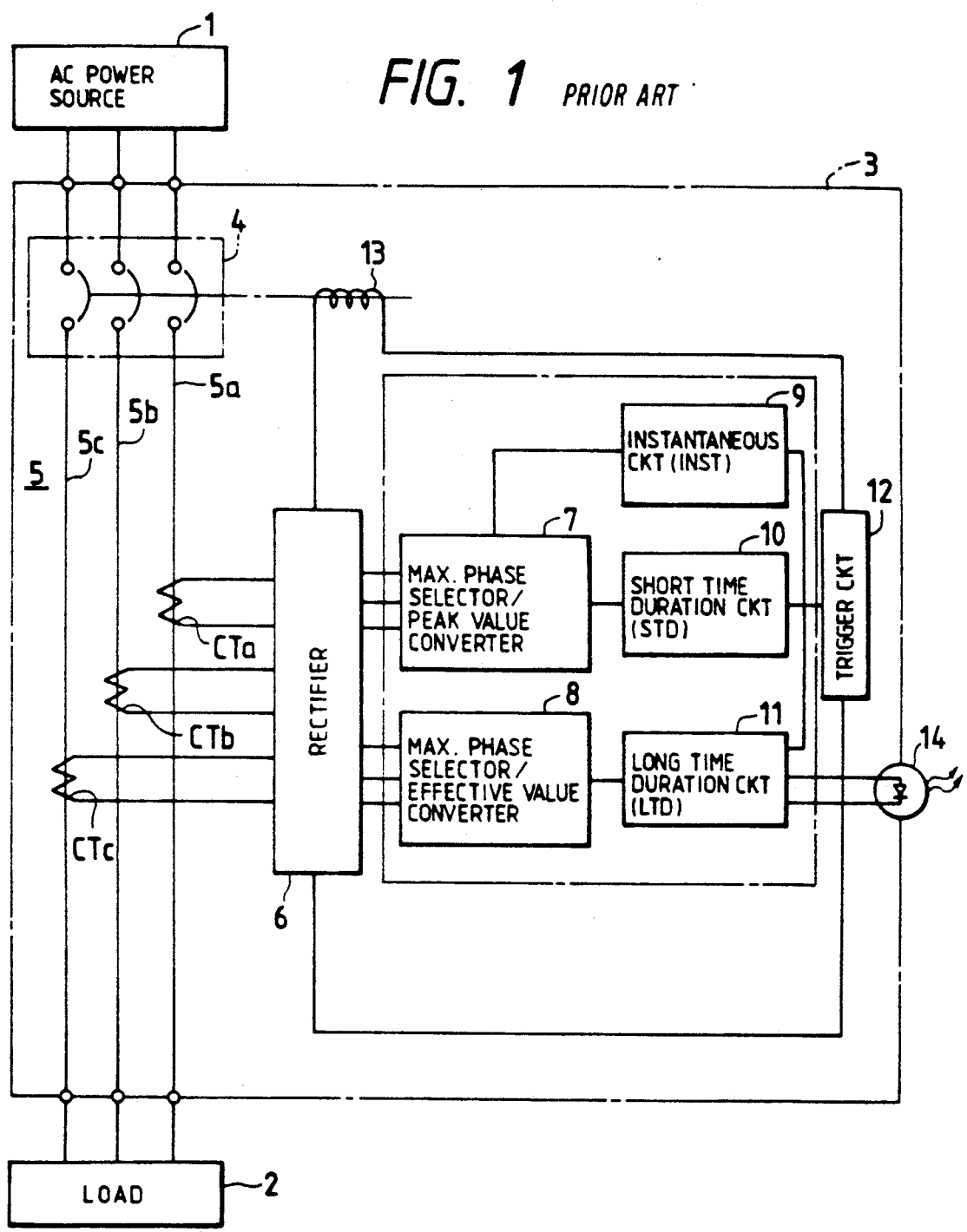
FIG. 1 is a block diagram showing a conventional circuit breaker.
Figure 2:
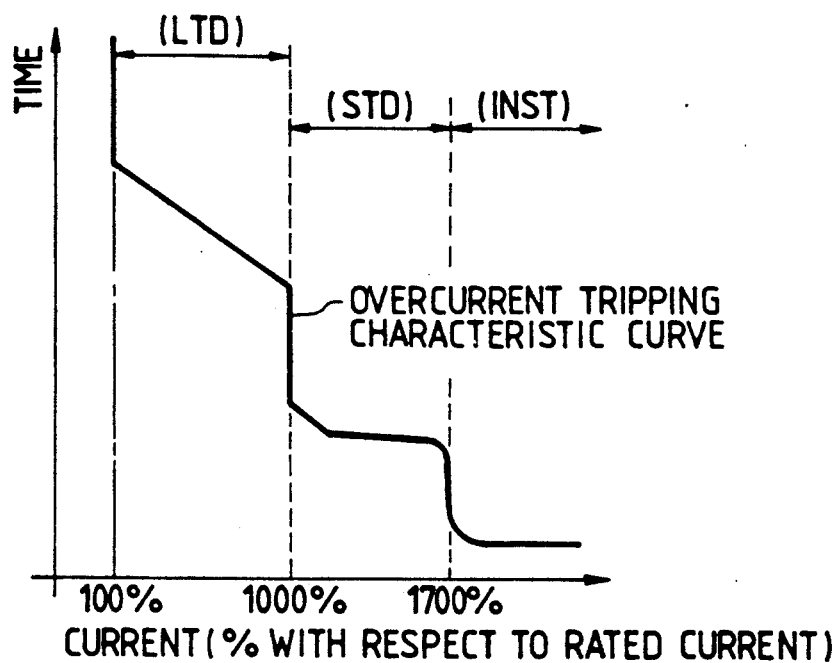
FIG. 2 is a graphical representation showing characteristic curves of the conventional circuit breaker.
Figure 4:
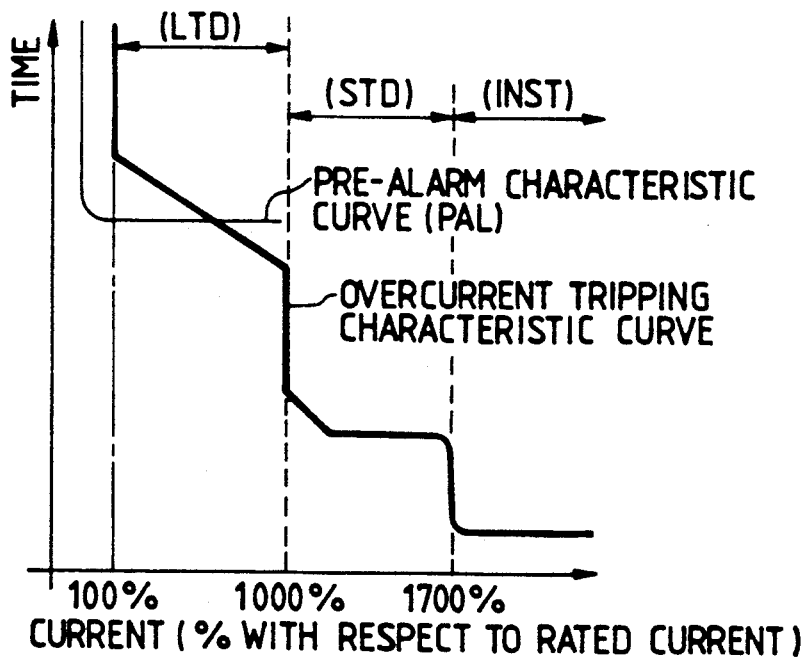
FIG. 4 is a graphical representation showing characteristic curves of the circuit breaker shown in FIG. 3.

FIG. 4 shows the overcurrent tripping and pre-alarm characteristic curves of the circuit breaker 3A.

In the circuit breaker 3A of this invention shown in FIG. 3, if a current flowing through the main circuit 5 exceeds a certain value not larger than 70% of the rated current value, the pre-alarm circuit 20 produces a pre-alarm signal to be applied through the photocoupler 27 to the pre-alarm output circuit 21, after a certain period of time, 40 seconds for instance has elapsed, the certain period of time being determined in accordance with a value of the DC signal derived from the maximum phase selector/effective value converter 8. viz., the pre-alarm characteristic PAL shown in FIG. 4. The pre-alarm output circuit 21 energizes the relay coil 24 to close the normally open contact 24a, and consequently the control power source 23 drives the buzzer 26 to sound and turns on the pre-alarm LED 25. The photocoupler 27 is electrically insulative, but allows a signal to pass therethrough from the pre-alarm circuit 20 to the pre-alarm output circuit 21. On the other hand, the photocoupler 27 inhibits a signal from passing therethrough in the direction from the pre-alarm output circuit 21 to the pre-alarm circuit 20.

The above, and other objects of the present invention are accomplished by the provision of a circuit breaker comprising: a pre-alarm circuit with such a pre-alarming function as to generate an alarm before a current flowing through a main circuit exceeds an overcurrent; a pre-alarm signal output circuit driven by an output signal from the pre-alarm circuit; and a photo coupler coupled in such a direction as to block the transmission of a signal from the pre-alarm signal output circuit to the pre-alarm circuit.

The circuit breaker thus arranged generates an alarm to an operator before the switch mechanism of the circuit breaker is turned off by the overcurrent flowing through the main circuit. The circuit breaker is improved in insensitiveness to noise. Further, if the pre-alarm output circuit fails, the overcurrent tripping section is normally operable while free from the failure.

What is claimed is:

1. A circuit breaker operative to detect an overcurrent flowing through a main circuit between an AC source and a load, and to perform an overcurrent tripping function, said circuit breaker further comprising:
    a pre-alarm circuit with such a pre-alarming function as to generate an alarm output signal before a current flowing through a main circuit exceeds an overcurrent;
    a pre-alarm signal output circuit driven by said alarm output signal from the pre-alarm circuit and being operative to generate at least one of an audio and visual alarm; and
    a photo-coupler coupled between said pre-alarm circuit and said pre-alarm signal output circuit and being operative in such a direction as to block the transmission of a signal from the pre-alarm signal output circuit to the pre-alarm circuit.

2. The circuit breaker as defined in claim 1 wherein said pre-alarm circuit produces the pre-alarm signal, when the main circuit current exceeds a value not larger than 70% of a rated current value.

3. The circuit breaker as defined in claim 1 wherein said photocoupler comprises a light emission diode coupled to said pre-alarm circuit and a phototransistor coupled to said pre-alarm signal output circuit.

* * * * *